(12) United States Patent
Ogiura

(10) Patent No.: US 6,922,879 B2
(45) Date of Patent: Aug. 2, 2005

(54) METHOD OF MANUFACTURING AN ACCELERATION SENSOR

(75) Inventor: Mitsugu Ogiura, Shiga-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/694,513

(22) Filed: Oct. 27, 2003

(65) Prior Publication Data
US 2004/0085000 A1 May 6, 2004

Related U.S. Application Data

(62) Division of application No. 10/045,965, filed on Jan. 10, 2002, now Pat. No. 6,710,519.

(30) Foreign Application Priority Data

Jan. 12, 2001 (JP) ........................................ 2001-004587

(51) Int. Cl.[7] ..................... H04R 17/00; H01L 4/04; H01L 4/08; H01L 4/18; H01L 2/00
(52) U.S. Cl. ........................ 29/25.35; 29/412; 29/417; 29/593; 29/594; 29/831; 29/847; 310/329
(58) Field of Search ................. 29/25.35, 594, 29/412, 417, 847, 593, 831; 310/359, 366, 329, 332

(56) References Cited

U.S. PATENT DOCUMENTS

| | | | |
|---|---|---|---|
| 4,443,729 A | | 4/1984 | Rider |
| 5,118,982 A | * | 6/1992 | Inoue et al. ............... 310/366 |
| 5,440,195 A | * | 8/1995 | Ohnishi et al. ............ 310/359 |
| 5,490,422 A | | 2/1996 | Tabota et al. |
| 5,515,725 A | | 5/1996 | Tabota et al. |
| 5,763,982 A | | 6/1998 | Tabota et al. |
| 5,903,086 A | * | 5/1999 | Ogiso et al. ............... 310/359 |
| 5,914,556 A | | 6/1999 | Tabota et al. |
| 5,959,391 A | * | 9/1999 | Ogiso et al. ............... 310/359 |
| 5,991,988 A | | 11/1999 | Tabota et al. |
| 6,043,588 A | | 3/2000 | Tabota et al. |
| 6,091,180 A | * | 7/2000 | Unami et al. .............. 310/328 |
| 6,227,051 B1 | | 5/2001 | Otsuchi et al. |
| 6,233,801 B1 | | 5/2001 | Tabota et al. |

FOREIGN PATENT DOCUMENTS

| | | |
|---|---|---|
| JP | 6-273439 | 3/1994 |
| JP | 8-75774 | 3/1996 |
| JP | 8-166401 | 6/1996 |
| JP | 10-62445 | 3/1998 |
| JP | 11-051962 | 2/1999 |
| JP | 2000-121661 | 4/2000 |

* cited by examiner

Primary Examiner—Carl J. Arbes
Assistant Examiner—Tai Nguyen
(74) Attorney, Agent, or Firm—Keating & Bennett, LLP (57) ABSTRACT

An acceleration sensor includes a piezoelectric element and support frames for supporting the ends of the piezoelectric element in the longitudinal direction. The piezoelectric element is formed by stacking an even number of piezoelectric layers greater than or equal to four layers. Electrodes are provided in between the layers and on the front and back faces of the piezoelectric element. The interlayer electrodes including a segmented electrode and lead electrodes are alternately stacked with the piezoelectric layers therebetween. The interlayer electrode in the middle in the thickness direction is a segmented electrode. The piezoelectric layers are polarized in the thickness direction so that charge having the same polarity is extracted from the electrodes when the acceleration is applied. Also, the center portion and both end portions of each piezoelectric layer are polarized in opposite directions.

1 Claim, 5 Drawing Sheets

↔ EXPANSION STRESS
⨉ CONTRACTION STRESS

↔ EXPANSION STRESS
>< CONTRACTION STRESS

FIG. 6

↔ EXPANSION STRESS
✕ CONTRACTION STRESS

METHOD OF MANUFACTURING AN ACCELERATION SENSOR

This application is a Divisional of U.S. patent application Ser. No. 10/045,965 filed Jan. 10, 2002, currently now U.S. Pat. No. 6,710,519.

BACKGROUND OF THE INVENTION

1. Field of the Invention

The present invention relates to acceleration sensors and manufacturing methods thereof.

2. Description of the Related Art

A known acceleration sensor utilizing piezoelectric ceramics is described in, for example, Japanese Unexamined Patent Application Publication No. 6-273439. The known acceleration sensor includes a piezoelectric element having a bimorph structure. The bimorph piezoelectric element is formed by bonding a pair of piezoelectric ceramic layers so as to face each other, providing an intermediate electrode between the piezoelectric ceramic layers, and providing signal extraction electrodes on the front and back faces of the bimorph piezoelectric element. The bimorph piezoelectric element is housed in and supported by a double beam structure. In the acceleration sensor, a center portion and both end portions of each of the piezoelectric ceramic layers in the longitudinal direction are polarized in opposite directions. Thus, charge generated in the center portion and both end portions can be externally extracted. As a result, the charge extraction efficiency can be improved.

In the bimorph acceleration sensor, it is necessary to differently polarize the center portion and the end portions of each of the piezoelectric ceramic layer. To this end, surface electrodes which are separated from each other are formed on a surface of the piezoelectric ceramic layer, and, after polarization, a connection electrode which completely covers the surface electrodes is formed, whereby a signal extraction electrode is formed. An acceleration sensor which can reduce the burden of two-step electrode formation is proposed in Japanese Unexamined Patent Application Publication No. 8-166401.

In both of the above-described acceleration sensors, the piezoelectric element is formed by the two piezoelectric ceramic layers, and the capacitance of the piezoelectric element is relatively small. Thus, the charge sensitivity is not very high.

In order to improve the charge sensitivity, an acceleration sensor including a piezoelectric element formed by stacking three piezoelectric ceramic layers is proposed (see Japanese Unexamined Patent Application Publication No. 10-62445). In this case, the capacitance is increased by increasing the number of piezoelectric layers being stacked. As a result, the charge sensitivity can be improved. The structure is, however, limited in that the polarization direction cannot be reversed in the same piezoelectric layer. Thus, charge can be extracted only from the center portion of a piezoelectric crystal, and the charge extraction efficiency is not very high.

SUMMARY OF THE INVENTION

Accordingly, it is an object of the present invention to provide an acceleration sensor which can efficiently collect charge generated by applying acceleration and which has a high charge sensitivity and a high detection sensitivity.

It is another object of the present invention to provide a manufacturing method for efficiently manufacturing an acceleration sensor which is thin and small and which has a high detection sensitivity.

The foregoing objects are achieved through provision of an acceleration sensor and a manufacturing method thereof according to the following aspects of the present invention.

According to a first aspect of the present invention, an acceleration sensor is provided including a piezoelectric element which is formed by stacking an even number of piezoelectric layers greater than or equal to four layers; support members for supporting both ends of the piezoelectric element in the longitudinal direction; and electrodes which are provided in between the layers and on the front and back faces of the piezoelectric element. The interlayer electrodes include an electrode which is segmented into portions in the longitudinal direction near inflection points between an expansion stress and a contraction stress applied to the piezoelectric element in response to the application of an acceleration and lead electrodes led to the ends of the piezoelectric element in the longitudinal direction. The two types of interlayer electrodes are alternately stacked with the piezoelectric layers therebetween. The interlayer electrode in the middle of the piezoelectric element in the thickness direction is the segmented electrode. The electrodes on the front and back faces of the piezoelectric element are led to the ends of the piezoelectric element in the longitudinal direction in order to extract generated charge. The piezoelectric layers are polarized in the thickness direction so that, when the acceleration is applied, charge having the same polarity is extracted from the lead electrodes led to the ends in the longitudinal direction in the piezoelectric layers on both sides of the lead electrodes and so that the center portion and both end portions of each piezoelectric layer are polarized in opposite directions.

According to a second aspect of the present invention, an acceleration sensor is provided including a piezoelectric element which is formed by stacking an odd number of piezoelectric layers greater than or equal to five layers; support members for supporting both ends of the piezoelectric element in the longitudinal direction; and electrodes which are formed in between the layers and on the front and back faces of the piezoelectric element. The interlayer electrodes include electrodes which are segmented into portions in the longitudinal direction near inflection points between an expansion stress and a contraction stress applied to the piezoelectric element in response to the application of an acceleration and lead electrodes led to the ends of the piezoelectric element in the longitudinal direction. The interlayer electrodes which are arranged on both sides of the piezoelectric layer in the middle of the piezoelectric element in the thickness direction are the segmented electrodes. The two types of interlayer electrodes are alternately stacked with the piezoelectric layers therebetween, excluding the piezoelectric layer in the middle in the thickness direction. The electrodes on the front and back faces of the piezoelectric element are led to the ends of the piezoelectric element in the longitudinal direction in order to extract generated charge. Among the piezoelectric layers, the piezoelectric layer in the middle in the thickness direction is not polarized. The other piezoelectric layers are polarized in the thickness direction so that, when the acceleration is applied, charge having the same polarity is extracted from the lead electrodes led to the ends in the longitudinal direction in the piezoelectric layers on both sides of the lead electrodes and so that the center portion and both end portions of each piezoelectric layer are polarized in opposite directions.

The acceleration sensor according to the first aspect of the present invention has a structure in which the piezoelectric element includes an even number of piezoelectric layers greater than or equal to four layers. The acceleration sensor according to the second aspect of the present invention has a structure in which the piezoelectric element includes an odd number of piezoelectric layers greater than or equal to five layers. In both structures, the number of piezoelectric layers is greater than that of a two-layer acceleration sensor. Thus, the capacitance can be increased. Because the center portion and both end portions of each of the piezoelectric layers are polarized in opposite directions, charge generated in the center portion and both end portions of the piezoelectric element can be efficiently collected, thus increasing the charge extraction efficiency. As a result, although the acceleration sensor has a multi-layered structure, generated charge can be extracted from both the center portion and the end portions. Thus, the acceleration sensor has a higher charge sensitivity than previously achieved.

When the acceleration sensor has a structure in which both ends of the piezoelectric element are supported, the center portion and both end portions of the piezoelectric element are subjected to different stresses (contraction and expansion) in response to the application of an acceleration. In order to obtain generated charge having the same polarity, it is necessary to reverse the polarization direction within each layer. Specifically, when polarizing each layer, it is necessary to apply voltages having different polarities to the center portion and to both end portions. In order to prevent short-circuits, it is necessary to electrically isolate the surface electrodes and the interlayer electrodes according to each region to which voltage is applied. At the same time, charge can be collected by electrically connecting the electrodes in the regions. Generally, it is necessary to electrically connect the electrodes in the regions after polarization. However, when the electrodes are isolated inside the ceramic, it is technically impossible to connect the electrodes after the polarization in such a layered compact generated by simultaneously firing the electrodes and the piezoelectric ceramic.

According to the present invention, an electrode (segmented electrode) inside the ceramic and electrodes (lead electrodes) led to the ends of the piezoelectric element in the longitudinal direction are alternately formed, and polarization is performed in between these electrodes, thus achieving a structure in which the center portion and both end portions are polarized in different directions. By collecting charge from the lead electrodes, it is possible to efficiently extract the generated charge.

In a case in which the number of piezoelectric layers is 4n and a case in which the number of piezoelectric layers is 4n+2, polarization electrodes formed on the front and back faces of a piezoelectric ceramic fired compact are different in form. Specifically, when the number of piezoelectric layers is 4n, it is necessary to form segmented polarization electrodes on the front and back faces of the piezoelectric ceramic fired compact. With the segmented electrodes, the generated charge cannot be extracted from the ends in the longitudinal direction. It is thus necessary to form a connection electrode for connecting the segmented electrodes. Alternatively, the segmented electrodes can be removed, and subsequently new electrodes led to the ends of the piezoelectric element in the longitudinal direction can be formed. As a result, the charge can be extracted.

When the number of piezoelectric layers is 4n+2, the polarization electrodes are provided by forming lead electrodes led to the ends in the longitudinal direction on the front and back faces of the piezoelectric ceramic fired compact. These electrodes can be used as electrodes from which charge can be extracted.

In the acceleration sensor according to the first aspect of the present invention, the number of piezoelectric layers may be four. In this case, the structure is the simplest, and the charge can be efficiently extracted. The acceleration sensor is thus suitable for mass production, and the cost is reduced.

In the acceleration sensor according to the second aspect of the present invention, the number of piezoelectric layers may be five. In this case, there is an intermediate layer in the middle in the thickness direction which is not polarized. Similar to the four-layer acceleration sensor, charge can be efficiently extracted.

According to a third aspect of the present invention, a manufacturing method for manufacturing an acceleration sensor is provided. Segmented electrodes and electrodes connected in the longitudinal direction are alternately stacked. Prior to cutting a piezoelectric ceramic fired compact (which functions as a base) into individual elements, the segmented electrodes are externally led. By applying a DC electric field in between the segmented electrodes and the electrodes connected in the longitudinal direction, polarization is performed so that the center portion and both end portions of each piezoelectric layer in the longitudinal direction are polarized in opposite directions. According to the present invention, ceramic green sheets are stacked, and firing of the ceramic green sheets and baking of a conductive paste are simultaneously performed. Although the acceleration sensor has a multi-layered structure, a thin piezoelectric element can be achieved. Thus, the capacitance can be improved. Because the piezoelectric ceramic fired compact is cut into elements after polarization, the manufacturing method is suitable, for mass production and is capable of creating uniform piezoelectric elements.

According to an acceleration sensor of the present invention, a piezoelectric element has a structure obtained by stacking at least four piezoelectric layers. Charge generated in response to the application of an acceleration can be extracted from the center portion and both end portion of each piezoelectric layer. The capacitance can be increased, and charge can be collected efficiently. As a result, it is possible to achieve an acceleration sensor with a high detection sensitivity.

DESCRIPTION OF THE PREFERRED EMBODIMENTS

Figure 1:
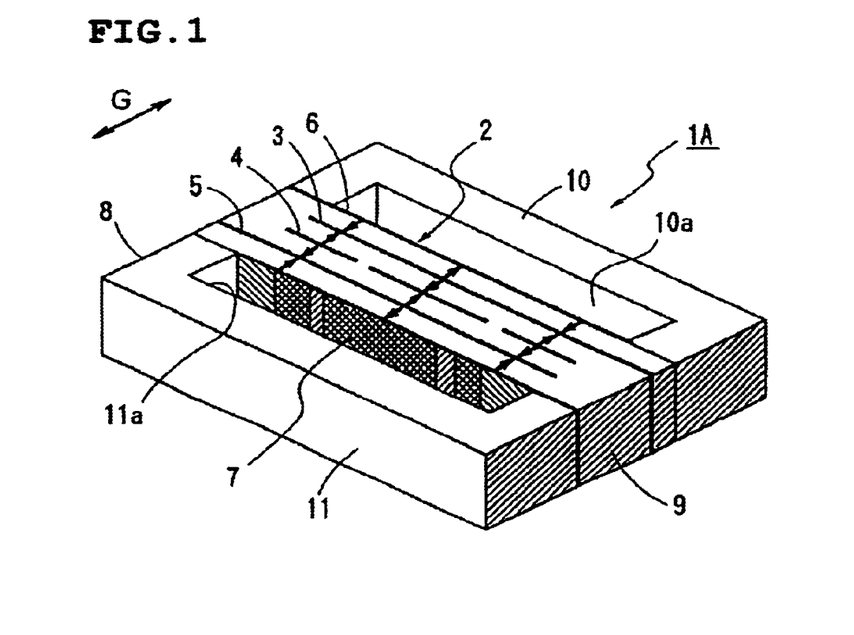
FIG. 1 is a perspective view of an acceleration sensor according to a first embodiment of the present invention.
Figure 2:
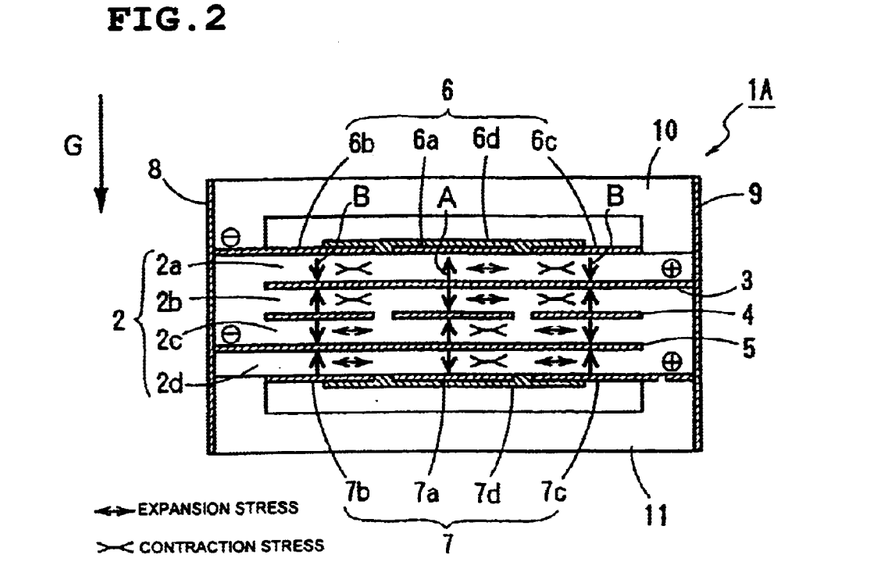
FIG. 2 is a front view of the acceleration sensor shown in FIG. 1.

FIGS. 1 to 3 show an acceleration sensor according to a first embodiment of the present invention.

An acceleration sensor 1A is formed by supporting a piezoelectric element 2 at both ends in the longitudinal direction by a pair of support frames (support members) 10 and 11 which have a substantially U-shaped cross section. The support frames 10 and 11 are formed of insulating ceramic which has approximately the same thermal expansion coefficient as the piezoelectric element 2. Inside the support frames 10 and 11, concave portions 10a and 11a are provided in order to enable the piezoelectric element 2 to bend in response to acceleration G.

The piezoelectric element 2 of the first embodiment is formed by stacking four strip-shaped, thin piezoelectric layers 2a, 2b, 2c, and 2d formed of piezoelectric ceramic and by integrally firing the piezoelectric layers 2a to 2d. Electrodes 3, 4, and 5 are provided in between the layers of the piezoelectric element 2. Electrodes 6 and 7 are provided on the front and back faces of the piezoelectric element 2. The interlayer electrodes 3 to 5 include the segmented electrode 4 and the lead electrodes 3 and 5. The segmented electrode 4 is segmented into three portions in the longitudinal direction near inflection points between an expansion stress and a contraction stress applied to the piezoelectric element 2 in response to the application of an acceleration. The lead electrodes 3 and 5 are led to different ends of the piezoelectric element 2 in the longitudinal direction. The two types of interlayer electrodes 3 to 5 are alternately stacked with the piezoelectric layers 2a to 2d therebetween. The interlayer electrode 4 in the middle of the piezoelectric element 2 in the thickness direction is a segmented electrode which is segmented into three portions. The number of segmented portions of the segmented electrode 4 is not limited to three. Moreover, the segmented electrode 4 can be segmented at points other than the inflection points.

The electrodes 6 and 7 on the front and back faces of the piezoelectric element 2 are led to different ends of the piezoelectric element 2 in the longitudinal direction in order to extract the generated charge. Similar to the segmented electrode 4, the electrodes 6 and 7 include electrodes 6a to 6c and electrodes 7a to 7c, which are obtained by dividing the electrodes into three near the inflection points, and connection electrodes 6d and 7d for connecting the electrodes 6a to 6c and 7a to 7c, respectively. Among the electrodes 6a to 6c and 7a to 7c, the electrode 6b is led to one end of the piezoelectric element 2 in the longitudinal direction, and the electrode 7c is led to the other end of the piezoelectric element 2 in the longitudinal direction. It is not necessary for each of the connection electrodes 6d and 7d to be a single electrode. For example, the connection electrode 6d may include an electrode that connects the electrodes 6a and 6b and an electrode that connects the electrodes 6a and 6c.

External electrodes 8 and 9 are formed on both end faces of the piezoelectric element 2 in the longitudinal direction, including end faces of the support frames 10 and 11. The external electrode 8 which is formed on one end face conducts to the electrode 6 on the front face and to the lead electrode 5. The external electrode 9 which is formed on the other end face conducts to the electrode 7 on the back face and to the lead electrode 3.

The piezoelectric layers 2a, 2b, 2c, and 2d are polarized in the directions indicated by the bold arrows in FIG. 2. Specifically, the piezoelectric layers 2a, 2b, 2c, and 2d are polarized in the thickness direction so that the piezoelectric layers on both sides of the interlayer electrodes 3 to 5 are polarized in opposite orientations and so that the center portion and both end portions of each piezoelectric layer are polarized in opposite directions. In the first embodiment, the center portion of each of the first and third layers 2a and 2c is in direction A and both end portions thereof are in direction B. The center portion of each of the second and fourth layers 2b and 2d is in direction B and both end portions thereof are in direction A. When acceleration G is applied to the piezoelectric element 2 in the plate-thickness direction, charge having the same polarity can be extracted from the lead electrodes 3 and 5 in the piezoelectric layers on both sides of the lead electrodes 3 and 5.

For example, when acceleration G is applied in the direction indicated by the arrow in FIG. 2, due to inertia, the center portion of the piezoelectric element 2 is deformed so as to be convex in the upward direction in FIG. 2. As a result, the center portions of the first layer 2a and the second layer 2b are subjected to an expansion stress, and the end portions thereof are subjected to a contraction stress. The center portions of the third layer 2c and the fourth layer 2d are subjected to a contraction stress, and the end portions thereof are subjected to an expansion stress. On the basis of the relationships between the stresses and the polarization directions, negative charge is generated at the electrode 6 on the front face and the lead electrode 5, and positive charge is generated at the electrode 7 on the back face and the lead electrode 3. The negative charge is extracted from the external electrode 8 formed on one end face, and the positive charge is extracted from the external electrode 9 formed on the other end face.

Even though the acceleration sensor 1A has a layered structure, generated charge can be collected from both the center portion and the end portions of each piezoelectric layer. Thus, the amount of charge collected in response to the application of the acceleration G is increased, and the acceleration sensor 1A has a higher detection sensitivity than previously achieved.

Table 1 shows a comparison among the piezoelectric sensor 1A using the four-layered piezoelectric element 2 in the first embodiment, an acceleration sensor X (see FIG. 1 of Japanese Unexamined Patent Application Publication No. 8-166401) which has a two-layer structure and which is polarized in the thickness direction so that piezoelectric layers on both sides of an inner electrode are polarized in opposite directions and so that the center portion and both end portions of each piezoelectric layer are polarized in opposite directions, and an acceleration sensor Y (see FIG. 1 of Japanese Unexamined Patent Application Publication No. 2000-121661) which similarly has a two-layer structure and which is polarized in the thickness direction so that piezoelectric layers on both sides of an inner electrode are polarized in the same direction and so that the center portion and both end portions of each piezoelectric layer are polarized in opposite directions. The comparison is indicated by assuming the capacitance, generated charge, and the voltage sensitivity of an acceleration sensor B to be 1.

As is clear from Table 1, the capacitance of the acceleration sensor 1A of the present invention is 2.5 times to 10 times that of the known acceleration sensors X and Y. The amount of charge generated by the acceleration sensor 1A is 1.8 times to 3.6 times that of the known acceleration sensors X and Y. It can be concluded that the acceleration sensor 1A has a good detection sensitivity.

TABLE 1

| Acceleration Sensor | Capacitance Ratio | Generated Charge Ratio |
|---|---|---|
| X | 1 | 1 |
| Y | 4 | 2 |
| 1A | 10.1 | 3.6 |

Referring to FIGS. 3A to 3F, a manufacturing method for manufacturing the acceleration sensor 1A arranged as described above will now be described.

Figure 3A:
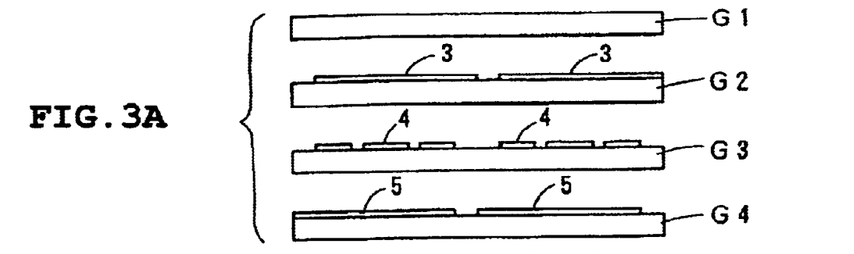
FIGS. 3A to 3F are process charts showing a manufacturing method for manufacturing the acceleration sensor shown in FIG. 1.

Referring to FIG. 3A, the process prepares four thin, rectangular ceramic green sheets G1 to G4 of a size large enough for a plurality of piezoelectric elements. Among the ceramic green sheets G1 to G4, a conductive paste, which is to become the lead electrode 3, is applied to the top surface of the second green sheet G2 using a screen printing technique or the like. Similarly, a conductive paste, which is to become the segmented electrode 4, is applied to the top surface of the third green sheet G3. A conductive paste, which is to become the lead electrode 5, is applied to top surface of the fourth green sheet G4. The application patterns of the electrodes 3 to 5 form strip electrodes extending in a direction perpendicular to the drawing. No conductive paste is applied to the top green sheet G1.

Figure 3B:
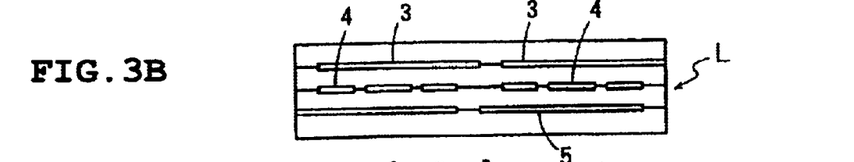

Referring to FIG. 3B, the four green sheets G1 to G4 are stacked and attached using pressure, thus forming a layered compact L. The lead electrodes 3 and 5 and the segmented electrode 4 are situated in between the green sheets. The layered compact L is fired at a predetermined temperature (for example, approximately 1000° C.), and hence the stacked green sheets are bonded to each other. At the same time, the electrodes 3 to 5 which are formed inside are also baked. Accordingly, a piezoelectric ceramic fired compact F is formed.

Figure 3C:
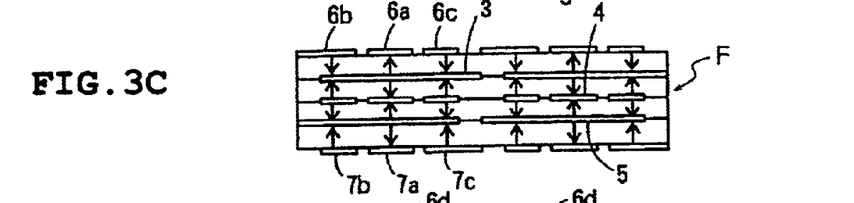

Referring to FIG. 3C, a conductive paste is applied to the front and back faces of the piezoelectric ceramic fired compact F. Subsequently, the piezoelectric ceramic fired compact F is subjected to drying and baking. As a result, the segmented electrodes 6a to 6c and 7a to 7c are formed. A DC electric field is applied to the electrodes 6a to 6c and 7a to 7c and in between the lead electrodes 3 and 5 and the segmented electrode 4, thus polarizing the piezoelectric ceramic fired compact F in directions A and B. Since the interlayer electrodes 3, 4, and 5 are provided inside the piezoelectric ceramic fired compact F, it is difficult to apply an electric field to these electrodes 3 to 5. The electrodes 3 to 5 are strip electrodes extending in the depth direction of the piezoelectric ceramic fired compact F (perpendicular to the drawing). In order to apply an electric field to the electrodes 3 to 5, one end of each of the electrodes 3, 4, and 5 is led outside the piezoelectric ceramic fired compact F. By applying a DC electric field in between the electrodes 3 to 5 and the electrodes 6a to 6c and 7a to 7c on the front and back faces, the piezoelectric ceramic fired compact F can be polarized in desired directions.

The polarization can be performed by a plurality of steps. Alternatively, the polarization can be performed by a single step using a plurality of voltages which have different polarities.

Figures 3D, 3E:
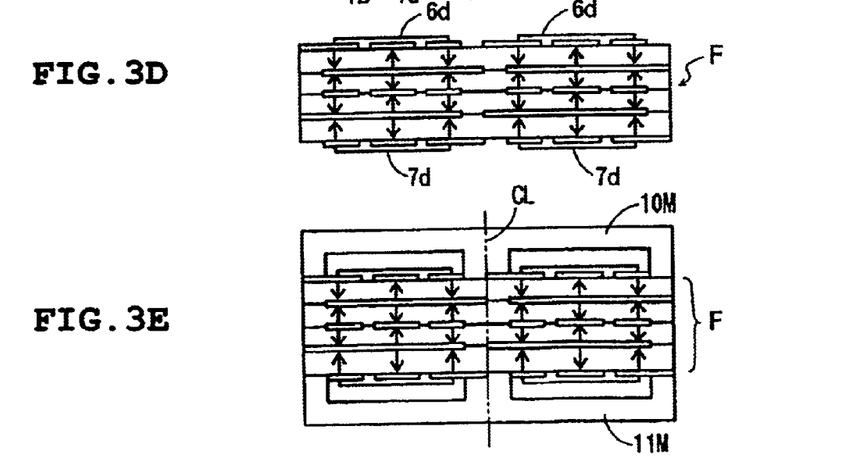
Figure 3F:
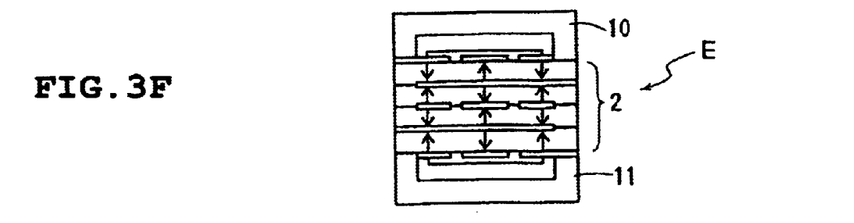

After the polarization, as shown in FIG. 3D, the connection electrodes 6d and 7d for connecting the segmented electrodes 6a to 6c and 7a to 7c are formed on the front and back faces of the piezoelectric ceramic fired compact F. The connection electrodes 6d and 7d can be formed by printing a conductive paste or by a thin film formation method such as sputtering or evaporation.

After the connection electrodes 6d and 7d are formed, as shown in FIG. 3E, support frames 10M and 11M, which function as a base, are bonded to the front and back faces of the piezoelectric ceramic fired compact F. The piezoelectric ceramic fired compact F and the support frames 10M and 11M are cut into elements in the longitudinal direction (cut line CL) and in a direction parallel to the drawing, thus creating a sensor element E shown in FIG. 3F.

Subsequently, the external electrodes 8 and 9 are formed on both end faces of each sensor element E. Consequently, the acceleration sensor 1A shown in FIGS. 1 and 2 is formed.

Figure 4:
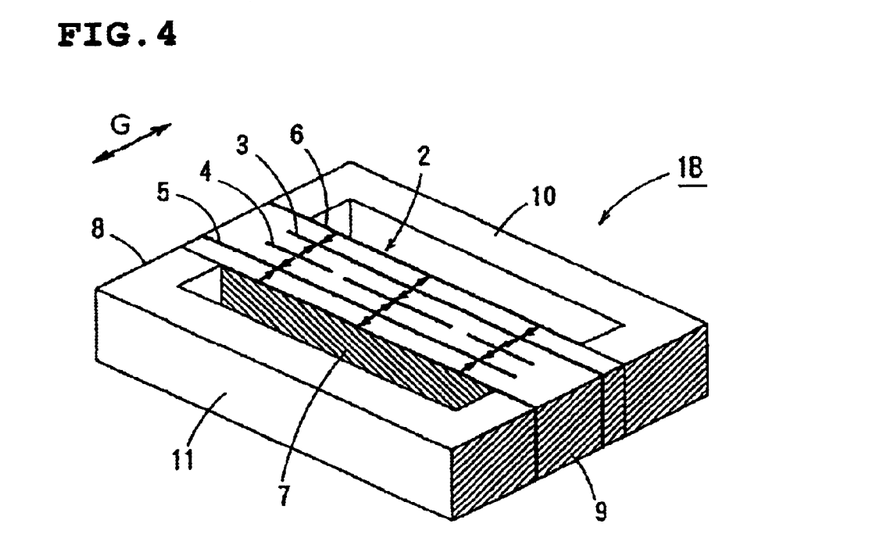
FIG. 4 is a perspective view of an acceleration sensor according to a second embodiment of the present invention.

FIG. 4 shows an acceleration sensor according to a second embodiment of the present invention.

In an acceleration sensor 1B of the second embodiment, each of the electrodes 6 and 7 formed on the front and back faces of the piezoelectric element 2 is a continuous electrode.

In the first embodiment, the electrodes 6 and 7 formed on the front and back faces of the piezoelectric element 2 include a set of the segmented electrodes 6a to 6c and 7a to 7c for polarization and the connection electrodes 6d and 7d for covering the segmented electrodes 6a to 6c and 7a to 7c. When the bonding between the two types of electrodes becomes weak, the risk of detachment increases. In order to prevent detachment, the segmented electrodes 6a to 6c and 7a to 7c for polarization are removed, and subsequently new lead electrodes 6 and 7 led to different ends of the piezoelectric element 2 in the longitudinal direction are formed.

The lead electrodes 6 and 7 are formed by printing a conductive paste or by a thin film formation method such as sputtering or evaporation.

Figure 5:
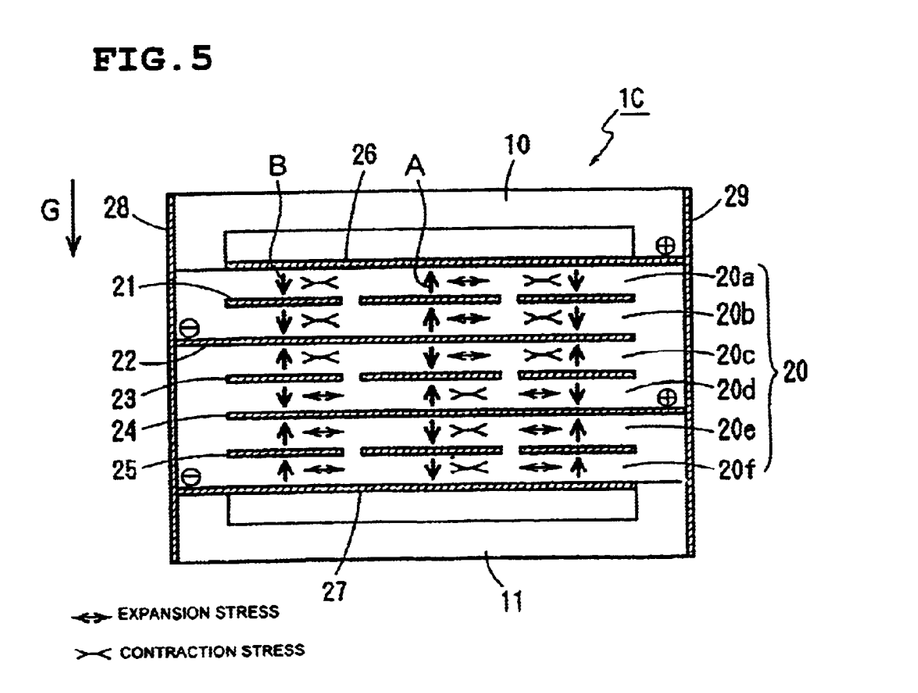
FIG. 5 is a front view of an acceleration sensor according to a third embodiment of the present invention.

FIG. 5 shows an acceleration sensor according to a third embodiment of the present invention.

In an acceleration sensor 1C of the third embodiment, the number of piezoelectric layers forming a piezoelectric element 20 is six. Since the support frames 10 and 11 are the same as those shown in FIG. 2, the same reference numerals are given and repeated descriptions of the common portions are omitted.

The piezoelectric element 20 is formed by stacking six piezoelectric layers 20a to 20f and integrally firing the piezoelectric layers 20a to 20f. Electrodes 21 to 25 are formed in between the layers of the piezoelectric element 20. Electrodes 26 and 27 are formed on the front and back faces of the piezoelectric element 20. The interlayer electrodes 21 to 25 include the segmented electrodes 21, 23, and 25 which are segmented into three portions in the longitudinal direction near inflection points between an expansion stress and a contraction stress applied to the piezoelectric element 20 in response to the application of an acceleration and the lead electrodes 22 and 24 which are led to different ends of the piezoelectric element 20 in the longitudinal direction. The two types of interlayer electrodes 21 to 25 are alternately stacked with the piezoelectric layers 20a and 20f therebetween. The interlayer electrode 23 in the middle of the piezoelectric element 20 in the thickness direction is a segmented electrode which is segmented into three portions.

The electrodes 26 and 27 on the front and back faces of the piezoelectric element 20 are led to different ends of the piezoelectric element 20 in the longitudinal direction in order to extract generated charge. External electrodes 28 and 29 are formed on both end faces of the piezoelectric element 20 in the longitudinal direction, including the end faces of the support frames 10 and 11. The external electrode 28 formed on one end face conducts to the electrode 27 on the back face and to the lead electrode 22. The external electrode 29 formed on the other end face conducts to the electrode 26 formed on the front face and to the lead electrode 24.

The piezoelectric layers 20a to 20f are polarized in the directions indicated by the bold arrows in FIG. 5. Specifically, the piezoelectric layers 20a to 20f are polarized in the thickness direction so that the piezoelectric layers on both sides of the interlayer electrodes 22 to 24 are polarized in opposite directions and so that the center portion and both end portions of each piezoelectric layer are polarized in opposite directions. The piezoelectric layers on both sides of the interlayer electrodes 21 and 25 are polarized in the same direction. In the third embodiment, the center portions of the first, second, and fourth layers 20a, 20b, and 20d are in direction A and both end portions thereof are in direction B. The center portions of the third, fifth, and sixth layers 20c, 20e, and 20f are in direction B, and both end portions thereof are in direction A. When acceleration G is applied to the piezoelectric element 20 in the plate-thickness direction, charge which exhibits the same polarity can be extracted from the lead electrodes 22 and 24 in the piezoelectric layers on both sides of the lead electrodes 22 and 24. When acceleration G is applied in the direction indicated by the arrow, as shown in FIG. 5, the center portion and both end portions of each layer are subjected to an expansion stress and a contraction stress. On the basis of the relationships between the stresses and the polarization directions, negative charge is generated at the lead electrode 22 and the back-face electrode 27, and positive charge is generated at the lead electrode 24 and the front-face electrode 26. The negative charge is extracted from the external electrode 28, and the positive charge is extracted from the external electrode 29.

In this case, similar to the first embodiment, the amount of charge generated in response to the application of the acceleration G is increased. Thus, the acceleration sensor 1C has a higher detection sensitivity than previously achieved.

Figure 6:
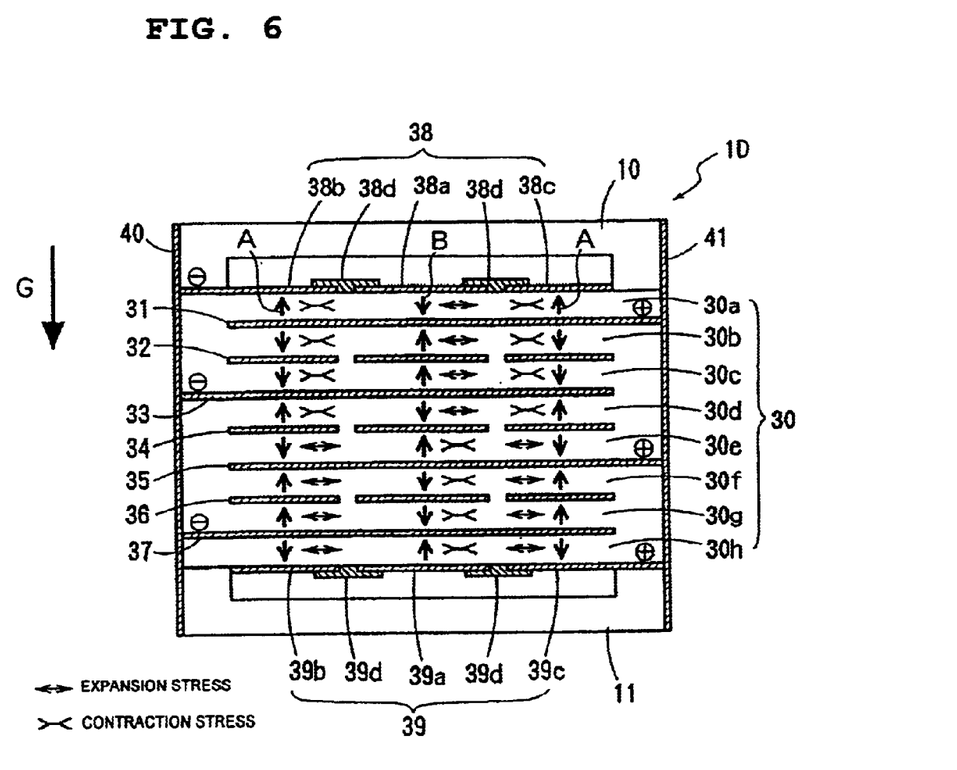
FIG. 6 is a front view of an acceleration sensor according to a fourth embodiment of the present invention.

FIG. 6 shows an acceleration sensor according to a fourth embodiment of the present invention.

In an acceleration sensor 1D of the fourth embodiment, the number of piezoelectric layers forming a piezoelectric element 30 is eight. Since the support frames 10 and 11 are the same as those shown in FIG. 2, the same reference numerals are given and repeated descriptions of the common portions are omitted.

The piezoelectric element 30 is formed by stacking eight piezoelectric layers 30a to 30h and integrally firing the piezoelectric layers 30a to 30h. Electrodes 31 to 37 are formed in between the layers of the piezoelectric element 30. Electrodes 38 and 39 are formed on the front and back faces of the piezoelectric element 30. The interlayer electrodes 31 to 37 include the segmented electrodes 32, 34, and 36 which are segmented into three portions in the longitudinal direction near inflection points between an expansion stress and a contraction stress applied to the piezoelectric element 30 in response to the application of an acceleration and the lead electrodes 31, 33, 35, and 37 which are led to different ends of the piezoelectric element in the longitudinal direction. The two types of interlayer electrodes 31 to 37 are alternately stacked with the piezoelectric layers 30a and 30h therebetween. The interlayer electrode 34 in the middle of the piezoelectric element 30 in the thickness direction is a segmented electrode which is segmented into three portions.

The electrodes 38 and 39 on the front and back faces of the piezoelectric element 30 are led to different ends of the piezoelectric element 30 in the longitudinal direction in order to extract generated charge. Similar to the segmented electrodes 32, 34, and 36, the electrodes 38 and 39 include electrodes 38a to 38c and 39a to 39c which are obtained by dividing the electrodes into three in the longitudinal direction near inflection points and connection electrodes 38d to 39d for connecting the electrodes 38a to 38c and 39a to 39c.

The electrodes 38 and 39 on the front and back faces of the piezoelectric element 30 are led to different ends of the piezoelectric element 30 in the longitudinal direction in order to extract generated charge. External electrodes 40 and 41 are formed on both end faces of the piezoelectric 30 in the longitudinal direction, including the end faces of the support frames 10 and 11. The external electrode 40 formed on one end face conducts to the electrode 38 on the front face and to the lead electrodes 33 and 37. The external electrode 41 formed on the other end face conducts to the electrode 39 formed on the back face and to the lead electrodes 31 and 35.

The piezoelectric layers 30a to 30h are polarized in the directions indicated by the bold arrows in FIG. 6. Specifically, the piezoelectric layers 30a to 30h are polarized in the thickness direction so that charge displaying the same polarity can be extracted from the lead electrodes 31, 33, 35, and 37 in the piezoelectric layers on both sides of the lead electrodes 31, 33, 35, and 37 and so that the center portion and both end portions of each piezoelectric layer are polarized in opposite directions. In the fourth embodiment, the center portions of the second, third, fifth, and eighth layers 30b, 30c, 30e, and 30h are in direction A and both end portions thereof are in direction B. The center portions of the first, fourth, sixth, and seventh layers 30a, 30d, 30f, and 30g are in direction B, and both end portions thereof are in direction A. When acceleration G is applied to the piezoelectric element 30 in the plate-thickness direction, as shown in FIG. 6, the center portion and both end portions of each layer are subjected to an expansion stress and a contraction stress. On the basis of the relationships between the stresses and the polarization directions, negative charge is generated at the lead electrodes 33 and 37 and the front-face electrode 38, and positive charge is generated at the electrodes 31 and 35 and the back-face electrode 39. The negative charge is extracted from the external electrode 40, and the positive charge is extracted from the external electrode 41.

In this case, similar to the first embodiment, the amount of charge generated in response to the application of the acceleration G is increased. Thus, the acceleration sensor 1D has a higher detection sensitivity than previously achieved.

FIG. 5 shows an acceleration sensor according to a fifth embodiment of the present invention.

Figure 7:
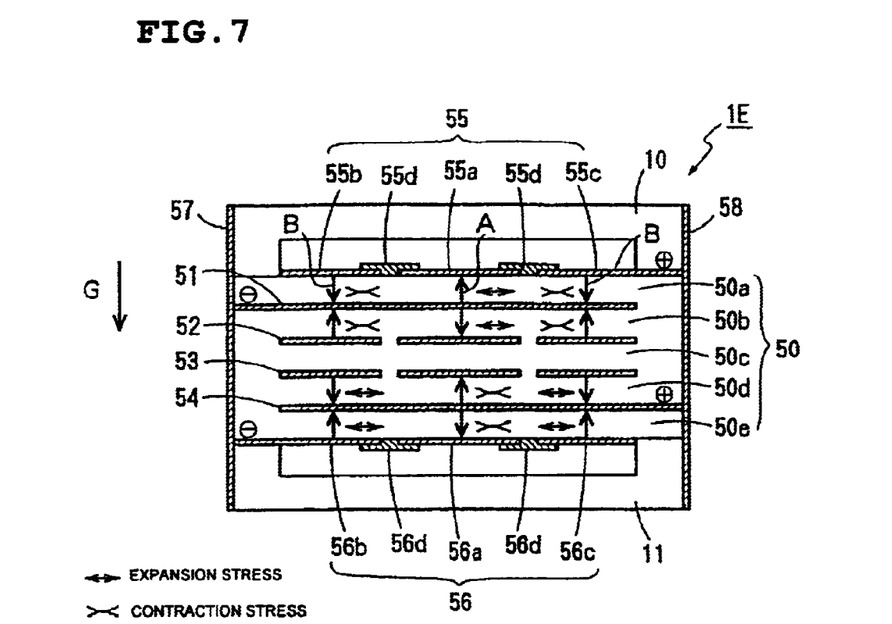
FIG. 7 is a front view of an acceleration sensor according to a fifth embodiment of the present invention.

An acceleration sensor 1E of the fifth embodiment uses a piezoelectric element 50 which has five piezoelectric layers. Since the support frames 10 and 11 are the same as those shown in FIG. 2, the same reference numerals are given and repeated descriptions of the common portions are omitted.

The piezoelectric element 50 is formed by stacking five piezoelectric layers 50a to 50e and integrally firing the piezoelectric layers 50a to 50e. Electrodes 51 to 54 are formed in between the layers of the piezoelectric element 50. Electrodes 55 and 56 are formed on the front and back faces of the piezoelectric element 50. The interlayer electrodes 51 to 54 include the segmented electrodes 52 and 53 which are segmented into three portions in the longitudinal direction near inflection points between an expansion stress and a contraction stress applied to the piezoelectric element 50 in response to the application of an acceleration and the lead electrodes 51 and 54 which are led to different ends of the piezoelectric element 50 in the longitudinal direction. The interlayer electrodes 52 and 53 situated on both sides of the piezoelectric layer 50c in the middle of the piezoelectric element 50 in the thickness direction are the segmented electrodes. The two types of interlayer electrodes 51 to 54 are alternately stacked with the piezoelectric layers 50a to 50e therebetween, excluding the piezoelectric layer 50c in the middle in the thickness direction.

The electrodes 55 and 56 on the front and back faces of the piezoelectric element 50 are led to different ends of the piezoelectric element 50 in the longitudinal direction in order to extract generated charge. Similar to the segmented electrodes 52 and 53, the electrodes 55 and 56 include electrodes 55a to 55c and 56a to 56c which are obtained by segmenting electrodes into three portions near the inflection points and connection electrodes 55d and 56d for connecting the electrodes 55a to 55c and 56a to 55c.

Similar to the segmented electrodes 52 and 53, in order to individually polarize the center portion and both end portions, the electrodes 55 and 56 on the front and back faces of the piezoelectric element 50 include the electrodes 55a to 55c and 56a to 56c which are obtained by dividing the electrodes into three near the inflection points and the connection electrodes 55d and 56d for connecting the electrodes 55a to 55c and 56a to 56c. The electrodes 55 and 56 on the front and back faces are led to different ends of the piezoelectric element 50 in the longitudinal direction in order to extract generated charge. External electrodes 57 and 58 are formed on both end faces of the piezoelectric 50 in the longitudinal direction, including the end faces of the support frames 10 and 11. The external electrode 57 formed on one end face conducts to the electrode 56 on the back face and to the lead electrode 51. The external electrode 58 formed on the other end face conducts to the electrode 55 formed on the front face and to the lead electrode 54.

The piezoelectric layers 50a to 50e are polarized in the directions indicated by the bold arrows in FIG. 7. Specifically, the piezoelectric layers 50a to 50e are polarized in the thickness direction so that charge displaying the same polarity can be extracted from the lead electrodes 51 and 54 in the piezoelectric layers on both sides of the lead electrodes 51 and 54 and so that the center portion and both end portions of each piezoelectric layer are polarized in opposite directions. In the fifth embodiment, the center portions of the first and fourth layers 50a and 50d are in direction A, and both end portions thereof are in direction B. The center portions of the second and fifth layers 50b and 50e are in direction B, and both end portions thereof are in direction A. The piezoelectric layer 50c in the middle in the thickness direction is a neutral layer which is not polarized. When acceleration G is applied to the piezoelectric element 50 in the plate-thickness direction, as shown in FIG. 7, the center portion and both end portions of each layer are subjected to an expansion stress and a contraction stress. On the basis of the relationships between the stresses and the polarization directions, negative charge is generated at the lead electrode 51 and the back-face electrode 56, and positive charge is generated at the lead electrode 54 and the front-face electrode 55. The negative charge is extracted from the external electrode 57, and the positive charge is extracted from the external electrode 58.

Although the piezoelectric layer 50c in the middle in the thickness direction is a neutral layer which generates no charge, similar to the first embodiment, charge can be extracted from the center portion and both end portions in the longitudinal direction. Thus, the amount of charge generated in response to the application of the acceleration G is increased, and hence the acceleration sensor 1E has a higher detection sensitivity than previously achieved.

Figure 8:
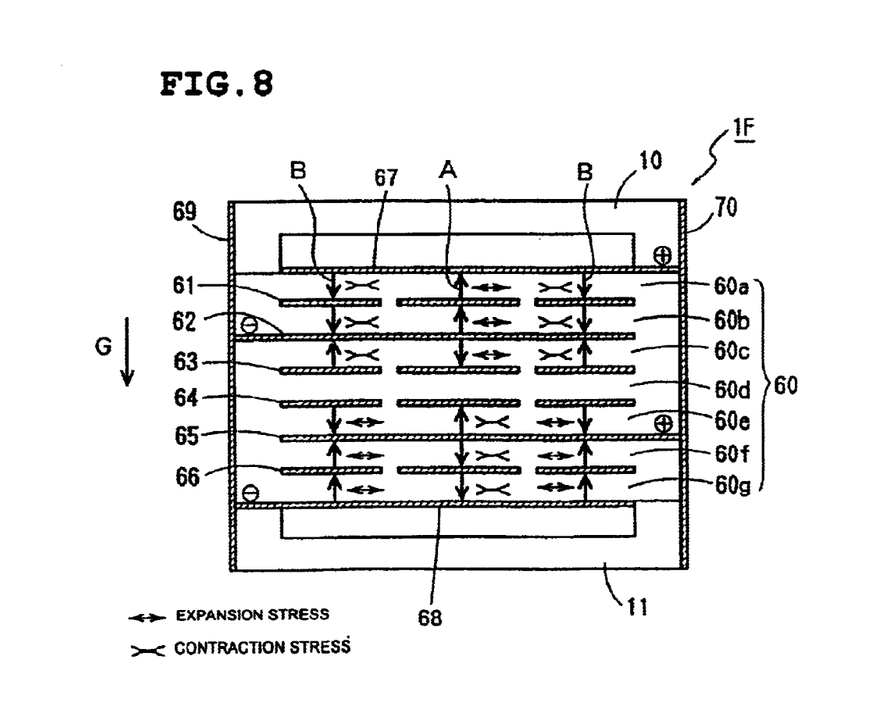
FIG. 8 is a front view of an acceleration sensor according to a sixth embodiment of the present invention.

FIG. 8 shows an acceleration sensor according to a sixth embodiment of the present invention.

An acceleration sensor 1F of the sixth embodiment uses a piezoelectric element 60 which has seven piezoelectric layers. Since the support frames 10 and 11 are the same as those shown in FIG. 2, the same reference numerals are given and repeated descriptions of the common portions are omitted.

The piezoelectric element 60 is formed by stacking seven piezoelectric layers 60a to 60g and integrally firing the piezoelectric layers 60a to 60g. Electrodes 61 to 66 are formed in between the layers of the piezoelectric element 60. Electrodes 67 and 68 are formed on the front and back faces of the piezoelectric element 60. The interlayer electrodes 61 to 66 include the segmented electrodes 61, 63, 64, and 66 which are segmented into three portions in the longitudinal direction near inflection points between an expansion stress and a contraction stress applied to the piezoelectric element 60 in response to the application of an acceleration and the lead electrodes 62 and 65 which are led to different ends of the piezoelectric element 60 in the longitudinal direction. The interlayer electrodes 63 and 64 situated on both sides of the piezoelectric layer 60d in the middle of the piezoelectric element 60 in the thickness direction are the segmented electrodes. The two types of interlayer electrodes 61 to 66 are alternately stacked with the piezoelectric layers 60a to 60g therebetween, excluding the piezoelectric layer 60d in the middle in the thickness direction.

The electrodes 67 and 68 on the front and back faces of the piezoelectric element 60 are led to different ends of the piezoelectric element 60 in the longitudinal direction in order to extract generated charge. External electrodes 69 and 70 are formed on both end faces of the piezoelectric 60 in the longitudinal direction, including the end faces of the support frames 10 and 11. The external electrode 69 formed on one end face conducts to the electrode 68 on the back face and to the lead electrode 62. The external electrode 70 formed on the other end face conducts to the electrode 67 formed on the front face and to the lead electrode 65.

The piezoelectric layers 60a to 60g are polarized in the directions indicated by the bold arrows in FIG. 8. Specifically, the piezoelectric layers 60a to 60g are polarized in the thickness direction so that charge displaying the same polarity can be extracted from the lead electrodes 62 and 65 in the piezoelectric layers on both sides of the lead electrodes 62 and 65 and so that the center portion and both end portions of each piezoelectric layer are polarized in opposite directions. In the sixth embodiment, the center portions of the first, second, and fifth layers 60a, 60b, and 60e are in direction A and both end portions thereof are in direction B. The center portions of the third, sixth, and seventh layers 60c, 60f, and 60g are in direction B, and both end portions thereof are in direction A. The piezoelectric layer 60d in the middle in the thickness direction is a neutral layer which is not polarized. When acceleration G is applied to the piezoelectric element 60 in the plate-thickness direction, as shown in FIG. 8, the center portion and both end portions of each layer are subjected to an expansion stress and contraction stress. On the basis of the relationships between the stresses and the polarization directions, negative charge is generated at the lead electrode 62 and the back-face electrode 68, and positive charge is generated at the lead electrode 65 and the front-face electrode 67. The negative charge is extracted from the external electrode 69, and the positive charge is extracted from the external electrode 70.

Although the piezoelectric layer 60d in the middle in the thickness direction is a neutral layer which generates no charge, similar to the first embodiment, charge can be extracted from the center portion and both end portions in the longitudinal direction. Thus, the amount of charge generated in response to the application of the acceleration G is increased, and the acceleration sensor 1F has a higher detection sensitivity than previously achieved.

In the foregoing embodiments, a case in which the number of layers is 4n has been described in the first, second, and fourth embodiments. A case in which the number of layers is 4n+2 has been described in the third embodiment. A case in which the number of layers is 4n+1 has been described in the fifth embodiment. A case in which the number of layers is 4n+3 has been described in the sixth embodiment. These cases are only a few examples. The number of layers can be increased.

In the example shown in FIG. 3, the piezoelectric element is formed by stacking the ceramic green sheets through the intermediary of a conductive paste and simultaneously firing the ceramic green sheets. Alternatively, a piezoelectric element can be formed by stacking a plurality of pre-fired ceramic sheets. However, the use of ceramic green sheets is advantageous over the use of pre-fired ceramic sheets in that a thinner piezoelectric element can be formed by stacking the ceramic green sheets. Thus, the capacitance can be increased, and the piezoelectric element can be miniaturized. Also, the manufacturing method can be simplified. For these reasons, the use of ceramic green sheets is preferable.

What is claimed is:

1. A manufacturing method for manufacturing an acceleration sensor, comprising the steps of:

preparing 4n planar green sheets made of piezoelectric ceramic, where n is an integer greater than or equal to 1;

applying a conductive paste on a surface of at least one of the green sheets at positions corresponding to a center portion and two end portions of individual piezoelectric elements in the longitudinal direction, so as to form a plurality of segmented electrodes for a plurality of piezoelectric elements;

applying a conductive paste on a surface of at least one of the other green sheets such that the conductive paste is led to a position corresponding to one end of each of the plurality of piezoelectric elements in the longitudinal direction, whereby first lead electrodes are formed for the plurality or piezoelectric elements;

applying a conductive paste on a surface of at least one of the other green sheets such that the conductive paste is led to a position corresponding to the other end, opposite to the one end, of each of the plurality of piezoelectric elements in the longitudinal direction, whereby second lead electrodes are formed for the plurality of piezoelectric elements;

stacking the green sheets such that the segmented electrodes and the first lead electrodes or the second lead electrodes are alternately arranged in such a manner that one of the segmented electrodes is positioned between a pair of the first lead electrodes and the second lead electrode and such that the electrode disposed in the middle in the thickness direction is one of the segmented electrodes, and stacking a green sheet without conductive paste as the topmost layer so as to obtain a stacked body;

firing the stacked body to produce a piezoelectric ceramic fired compact which includes a plurality of piezoelectric layers and simultaneously baking the conductive paste;

forming polarization electrodes on front and back faces of the piezoelectric ceramic fired compact, the polarization electrodes being segmented into portions according to the positions corresponding to a center portion and both end portions of each piezoelectric element in the longitudinal direction;

applying DC electric fields between the polarization electrodes and the first and second lead electrodes, and between the segmented electrodes and the first and second lead electrodes to polarize the piezoelectric ceramic fired compact in the thickness direction such that the piezoelectric layers provided on both sides of the lead electrodes are polarized in opposite directions and such that the center portion and both end portions of the same piezoelectric layer are polarized in opposite directions;

interconnecting the polarization electrodes or removing the polarization electrodes and forming continuous electrodes, whereby main electrodes leading to ends of the piezoelectric elements which are different in the longitudinal direction are formed on the front and back faces of the piezoelectric element;

cutting the piezoelectric ceramic fired compact into individual piezoelectric elements; and forming external electrodes on both end faces of the cut piezoelectric element and connecting the external electrodes to the lead electrodes formed inside the piezoelectric element and the main electrodes formed on the front and back faces of the piezoelectric element.

* * * * *